United States Patent
Lee et al.

(10) Patent No.: US 10,523,333 B2
(45) Date of Patent: Dec. 31, 2019

(54) OPTICAL SIGNAL TRANSMISSION APPARATUS FOR GENERATING MULTI-LEVEL OPTICAL SIGNAL AND METHOD PERFORMED BY THE SAME

(71) Applicant: ELECTRONICS AND TELECOMMUNICATIONS RESEARCH INSTITUTE, Daejeon (KR)

(72) Inventors: Jie Hyun Lee, Daejeon (KR); Sun Hyok Chang, Daejeon (KR); Joon Young Huh, Daejeon (KR); Sae-Kyoung Kang, Daejeon (KR); Joon Ki Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/023,187

(22) Filed: Jun. 29, 2018

(65) Prior Publication Data

US 2019/0158188 A1    May 23, 2019

(30) Foreign Application Priority Data

Nov. 23, 2017 (KR) .................. 10-2017-0157324

(51) Int. Cl.
*H04B 10/58* (2013.01)
*H04B 10/50* (2013.01)

(52) U.S. Cl.
CPC ....... *H04B 10/58* (2013.01); *H04B 10/50575* (2013.01); *H04B 2210/07* (2013.01)

(58) Field of Classification Search
CPC . H04B 10/548; H04B 10/0795; H04B 10/564
See application file for complete search history.

(56) References Cited

U.S. PATENT DOCUMENTS

| | | | | |
|---|---|---|---|---|
| 5,900,959 A | * | 5/1999 | Noda ................. | H04B 10/2537 398/147 |
| 6,493,131 B1 | * | 12/2002 | Tarng .................. | H04B 10/503 359/240 |

(Continued)

FOREIGN PATENT DOCUMENTS

| KR | 1020170058537 A | 5/2017 |
|---|---|---|
| KR | 10-2017-0109879 A | 10/2017 |

OTHER PUBLICATIONS

Jie Hyun Lee et al., "Experimental demonstration of real time 112 Gbit/s (2×56 Gbit/s) PAM-4 Transmission over 80 km single mode fiber using C-band EML", Nov. 2017, Photonics Conference 2017/WP-I-1.

*Primary Examiner* — Dzung D Tran
(74) *Attorney, Agent, or Firm* — LRK Patent Law Firm

(57) ABSTRACT

An optical signal transmission apparatus generates a multi-level optical signal from a multi-level electric signal. The optical signal transmission apparatus detects, based on a supervisory signal generated from an optical signal, an electric-to-optical (E/O) conversion characteristic of an E/O converter configured to convert an electric signal into an optical signal. For example, when the E/O converter generates a multi-level optical signal from a multi-level electric signal based on a bias signal, the optical signal transmission apparatus determines a correspondence relationship between the bias signal and the optical signal. The optical signal transmission apparatus adjusts a use range of intensities of the bias signal based on the determined correspondence relationship so that the E/O converter may linearly operate.

19 Claims, 6 Drawing Sheets

(56) References Cited

U.S. PATENT DOCUMENTS

| | | |
|---|---|---|
| 2006/0108501 A1 | 5/2006 | Draper et al. |
| 2006/0127104 A1* | 6/2006 | Harley ............... H04B 10/5053 |
| | | 398/198 |
| 2012/0155880 A1* | 6/2012 | Nishimoto ....... H04B 10/50572 |
| | | 398/79 |
| 2014/0161445 A1 | 6/2014 | Jeong et al. |
| 2014/0270811 A1 | 9/2014 | Park et al. |
| 2016/0149548 A1 | 5/2016 | Gorecki et al. |
| 2016/0269121 A1 | 9/2016 | Lee et al. |
| 2017/0019179 A1 | 1/2017 | Bhoja et al. |
| 2017/0163347 A1* | 6/2017 | Akiyama ........... H04B 10/0795 |

\* cited by examiner

OPTICAL SIGNAL TRANSMISSION APPARATUS FOR GENERATING MULTI-LEVEL OPTICAL SIGNAL AND METHOD PERFORMED BY THE SAME

CROSS-REFERENCE TO RELATED APPLICATION(S)

This application claims the priority benefit of Korean Patent Application No. 10-2017-0157324, filed on Nov. 23, 2017, in the Korean Intellectual Property Office, the disclosure of which is incorporated herein by reference for all purposes.

BACKGROUND

1. Field of the Invention

One or more example embodiments relate to an optical signal transmission apparatus, and more particularly, an apparatus and method for controlling an optical signal transmission apparatus.

2. Description of Related Art

With daily use of smartphones and social networks, an optical communication-based network is being continuously required to become higher in speed and to be increased in capacity. For a higher speed and a larger capacity of the optical communication-based network, research has been conducted on a method of increasing a transmission capacity per wavelength used in an optical communication based on wavelength division multiplexing (WDM) scheme. Current Ethernet uses a multi-level scheme of modulating an intensity of an optical signal at multiple levels to increase the transmission capacity per wavelength. Current Ethernet may transmit an optical signal using a pulse amplitude modulation (PAM) scheme, in particular, a PAM-4 scheme, as a multi-level scheme. A symbol rate of an optical signal generated based on a PAM-N scheme may be reduced by $\log_2 N$ times by changing an existing binary electrical signal, that is, a signal with two levels (0 and 1) to an optical signal with N levels exceeding 2. When the symbol rate is reduced, a transmission capacity per wavelength channel may be increased.

SUMMARY

Example embodiments provide an optical signal transmission apparatus for converting a multi-level electric signal into a multi-level optical signal and transmitting the multi-level optical signal, and a method performed by the optical signal transmission apparatus.

Example embodiments provide an optical signal transmission apparatus for accurately adjusting an interval between levels of a multi-level optical signal based on a user's intention.

According to an aspect, there is provided an optical signal transmission apparatus including an electric-to-optical (E/O) converter configured to convert an electric signal into an optical signal based on a bias signal, a supervisory signal generator configured to convert a portion of the optical signal into an electric signal and to generate a supervisory signal used to adjust the bias signal, and a controller configured to determine a correspondence relationship between the bias signal and the optical signal from the supervisory signal and to adjust the bias signal based on the determined correspondence relationship.

The controller may be configured to change an amplitude of the bias signal based on a predetermined interval within an input range of the bias signal that allows the bias signal to be input to the E/O converter, and configured to determine a use range of intensities of the bias signal required by the E/O converter to output a multi-level optical signal within the input range based on a supervisory signal generated based on the changed amplitude of the bias signal.

The controller may be configured to measure, based on the generated supervisory signal, a change in an intensity of the optical signal output from the E/O converter based on an amplitude of the bias signal corresponding to the use range.

The controller may be configured to determine a ratio between a change in the amplitude of the bias signal and a change in an intensity of the optical signal based on the generated supervisory signal, and configured to determine to change the use range when the determined ratio is less than or equal to a preset threshold.

When it is determined to change the use range, the controller may be configured to change the use range based on an amplitude of the bias signal that allows the determined ratio to be greater than or equal to the preset threshold.

When the intensity of the optical signal nonlinearly changes based on the change in the amplitude of the bias signal, the controller may be configured to change the use range based on the amplitude of the bias signal that allows the intensity of the optical signal to nonlinearly change.

The controller may be configured to determine whether to change the use range by comparing an average of intensities of the optical signal respectively corresponding to a maximum value and a minimum value within the use range to a predetermined target intensity or a predetermined target range.

The controller may be configured to adjust the bias signal so that an intensity of the optical signal is converted in correspondence to a plurality of levels of an intensity of the electric signal.

The controller may be configured to determine an intensity of the optical signal corresponding to each of the plurality of levels of the intensity of the electric signal in an output range of the intensity of the optical signal corresponding to a use range of intensities of the bias signal that allows the intensity of the optical signal to linearly change based on a change in the amplitude of the bias signal.

According to another aspect, there is provided an optical signal transmission apparatus including an amplifier configured to amplify an electric signal having an intensity of a level selected from a plurality of levels of an intensity of the electric signal, an E/O converter configured to convert the amplified electric signal into an optical signal, a supervisory signal generator configured to convert a portion of the optical signal into an electric signal and to generate a supervisory signal used to adjust a gain of the amplifier, and a controller configured to determine a correspondence relationship between the plurality of levels of the intensity of the electric signal and a plurality of levels of an intensity of the optical signal and to adjust the gain of the amplifier based on the determined correspondence relationship.

The controller may be configured to change the gain of the amplifier based on a predetermined interval within a maximum gain range in which the gain is changeable, and configured to determine a use gain range required by the E/O converter to output a multi-level optical signal within the maximum gain range based on a supervisory signal generated based on the changed gain.

The controller may be configured to determine a ratio between a change in the gain and a change in an intensity of the optical signal based on the generated supervisory signal, and configured to determine to change the use gain range when the determined ratio is less than or equal to a preset threshold.

When an intensity of the optical signal nonlinearly changes based on the changed gain, the controller may be configured to change the use gain range based on a range of a change in the gain that allows the intensity of the optical signal to nonlinearly change.

The controller may be configured to determine whether to change the use gain range by comparing an average of intensities of the optical signal respectively corresponding to a maximum value and a minimum value of the gain included in the use gain range to a predetermined target intensity or a predetermined target range.

The controller may be configured to determine the correspondence relationship based on an output range of an intensity of the optical signal corresponding to a range of a change in the gain that allows the intensity of the optical signal to linearly change.

According to another aspect, there is provided a method performed by an optical signal transmission apparatus, the method including changing an intensity of a control signal based on a predetermined interval, the control signal being input to an E/O converter configured to convert an electric signal into an optical signal or an amplifier configured to amplify the electric signal input to the E/O converter, receiving a supervisory signal generated by converting a portion of the optical signal output from the E/O converter into an electric signal in correspondence to the changed intensity of the control signal, acquiring a correspondence relationship between the control signal and the optical signal from the supervisory signal, and determining a use range of the intensity of the control signal based on the acquired correspondence relationship.

The acquiring of the correspondence relationship may include measuring a ratio between a change in the intensity of the control signal and a change in an intensity of the optical signal.

The determining of the use range may include determining the use range based on an intensity of the control signal that allows the ratio to be greater than or equal to a preset threshold.

The determining the use range may include determining whether to change the use range by comparing an average of intensities of the optical signal respectively corresponding to a maximum value and a minimum value within the use range to a predetermined target intensity or a predetermined target range.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
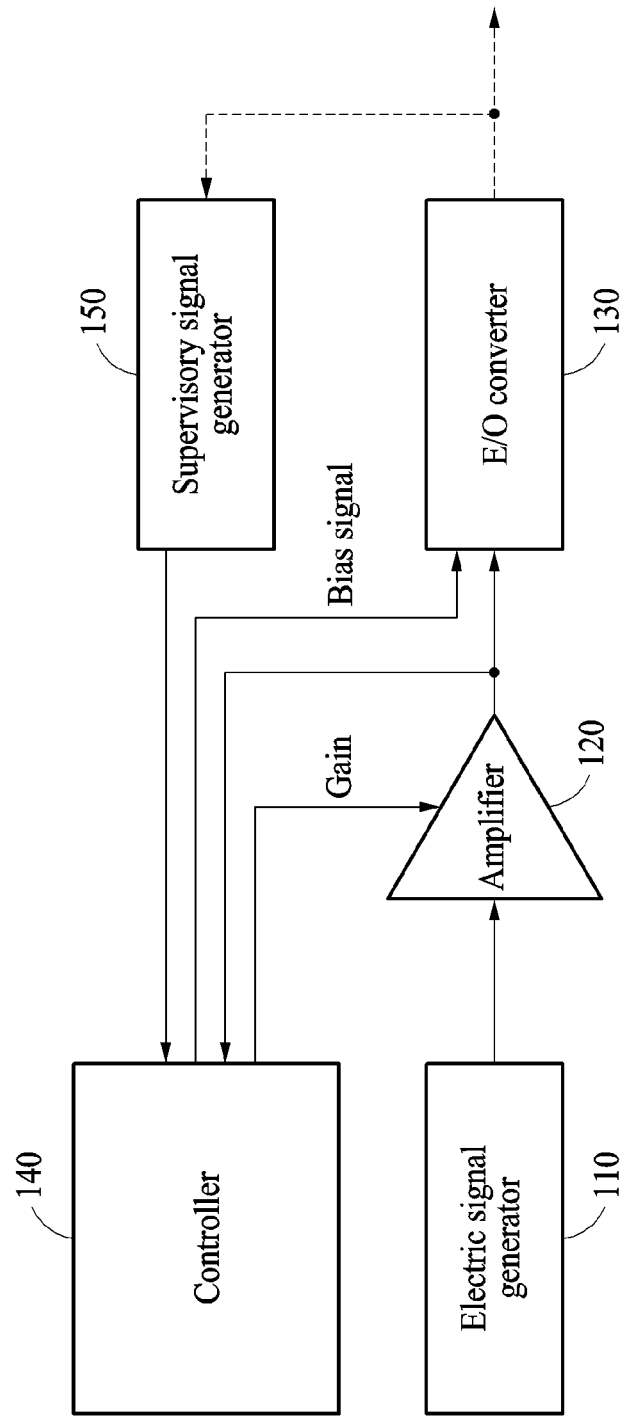
FIG. 1 is a diagram illustrating a structure of an optical signal transmission apparatus according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

FIG. 1 is a diagram illustrating a structure of an optical signal transmission apparatus according to an example embodiment.

Referring to FIG. 1, the optical signal transmission apparatus may include an electric signal generator 110 configured to generate an electric signal including digital data. An electric signal received by the electric signal generator 110 may be a binary electric signal representing 0 and 1 of digital data as two different types of intensities. The electric signal generator 110 may generate a multi-level electric signal representing digital data as at least two types of intensities (for example, four different types of intensities) from the binary electric signal. In other words, an intensity of the electric signal generated by the electric signal generator 110 may change at levels greater than two levels over time. The electric signal generator 110 may include a digital-to-analog converter (DAC) to generate a multi-level electric signal from a binary electric signal. Also, the electric signal generator 110 may combine forward error correction (FEC) data with the multi-level electric signal to correct an error of the multi-level electric signal.

Referring to FIG. 1, the optical signal transmission apparatus may include an amplifier 120 configured to amplify the electric signal, that is, a multi-level electric signal generated by the electric signal generator 110. A gain of the amplifier 120 may be controlled by a control signal received from an external device. A control signal to control the gain of the amplifier 120 may be generated by, for example, a controller 140 connected to the amplifier 120. The amplifier 120 may include a plurality of amplification devices, and the plurality of amplification devices may be connected in series. A control signal input to the amplifier 120 may include, for example, an electric signal to adjust a gain of the amplifier 120, an electric signal to control crossing between the plurality of amplification devices connected in series, and a bias signal of each of the plurality of amplification devices. The amplifier 120 may linearly amplify and output an electric signal generated by the electric signal generator 110.

The optical signal transmission apparatus may include an electric-to-optical (E/O) converter 130 configured to convert an electric signal into an optical signal based on a bias signal. Referring to FIG. 1, the E/O converter 130 may convert a multi-level electric signal amplified by the amplifier 120 into a multi-level optical signal. The bias signal input to the E/O converter 130 may be generated by, for example, the controller 140 connected to the E/O converter 130.

A direct current (DC) bias signal or an alternating current (AC) signal may be input to the E/O converter 130 so that the E/O converter 130 may output a multi-level optical signal. The DC bias signal and the AC signal may be voltage signals or current signals based on a type of the E/O converter 130. DC bias signal and the AC signal may be independently input to the E/O converter 130, or may be simultaneously input via the amplifier 120 or a laser driver chip. Although not shown in FIG. 1, when the optical signal transmission apparatus includes a laser diode (for example, a continuous wave (CW) laser diode) using an external modulation scheme, a DC bias signal for an operation of a CW laser diode may be separately input. When the optical signal transmission apparatus includes an optical signal amplifier, a control signal for the optical signal amplifier may be separately input.

In an example, the E/O converter 130 may use a laser diode with a direct modulation scheme, such as a vertical-cavity surface-emitting laser (VCSEL) and a distributed feedback (DFB) laser diode, to convert an electric signal into an optical signal. In another example, the E/O converter 130 may generate an optical signal corresponding to an input electric signal from an optical signal of a laser diode by utilizing an external modulation using an electro-absorption modulator (EAM) and a Mach-Zehnder modulator (MZM). In this example, the MZM may be a modulator made of lithium niobite (LiNbO$_3$), indium phosphide (InP) or silicon, and may include one electrode, two electrodes, or a multi-section electrode. Also, a CW laser diode used in the E/O converter 130 that utilizes the external modulation may be a laser diode with a wavelength tuning scheme.

Furthermore, the E/O converter 130 may include a plurality of laser diodes that use different wavelengths, to generate an optical signal having a plurality of levels of an intensity and different wavelengths using a wavelength-division multiplexing (WDM) multiplexer (MUX). Although not shown in FIG. 1, the optical signal transmission apparatus may include an optical signal amplifier configured to amplify an optical signal generated by the E/O converter 130.

Referring back to FIG. 1, the optical signal transmission apparatus may include a supervisory signal generator 150 configured to generate a supervisory signal by performing optical-to-electric (O/E) conversion of a portion of the optical signal output from the E/O converter 130. The supervisory signal generator 150 may be included in the E/O converter 130. The supervisory signal generator 150 may convert a portion of the optical signal generated by the E/O converter 130 into an electric signal, and may generate a supervisory signal used to adjust a bias signal. As a result, the supervisory signal generator 150 may provide as feedback the supervisory signal generated by the O/E conversion of the optical signal output from the E/O converter 130 to the optical signal transmission apparatus. To perform the O/E conversion of the optical signal output from the E/O converter 130, the supervisory signal generator 150 may include a monitoring photodiode (PD).

The supervisory signal may be used to adjust a bias signal input to the E/O converter 130. A number of supervisory signal generators 150 may be determined based on the type of the E/O converter 130. The optical signal transmission apparatus may monitor a modulated optical signal only, or may monitor both an intensity of the modulated optical signal and an intensity of an optical signal of a CW laser diode. In addition, the supervisory signal may be used to adjust an electric signal to control the gain of the amplifier 120. In the following description, an electric signal (for example, a bias signal input to the E/O converter 130, an AC signal input to the E/O converter 130, or an electric signal to control a gain of the amplifier 120 or an optical signal amplifier) that may be adjusted by the supervisory signal may be referred to as a "control signal." When the E/O converter 130 generates an optical signal by a direct modulation scheme of directly receiving a multi-level electric signal, as a bias signal or a driving current, a control signal may be a signal obtained by combining a multi-level electric signal and a bias signal (for example, a DC signal in the direct modulation scheme).

Also, in FIG. 1, the optical signal transmission apparatus may include the controller 140 configured to generate and adjust a control signal, for example, a bias signal of the E/O converter 130 and an electric signal to control a gain of the amplifier 120. Although not shown in FIG. 1, the controller 140 may include a supervisory signal processing device configured to receive a supervisory signal of the supervisory signal generator 150. The supervisory signal processing device may process the supervisory signal using an analog-to-digital converter (ADC).

When the supervisory signal generator 150 converts a portion of the optical signal of the E/O converter 130 into a supervisory signal and provides the supervisory signal as feedback to the controller 140, the controller 140 may differentiate an intensity (for example, an amplitude of the optical signal) of an optical signal detected based on the supervisory signal. A degree to which the intensity of the optical signal changes may be acquired by differentiating the intensity of the optical signal, and may be used to determine a ratio of change in an E/O conversion characteristic or a differential coefficient.

A ratio of change in an E/O conversion characteristic that may be determined by the controller 140 may include, for example, a ratio between a change in an amplitude of a bias signal and a change in an intensity of an optical signal, a ratio between a change in the gain of the amplifier 120 and the change in the intensity of the optical signal, and a ratio between a change in a gain of an optical signal amplifier and the change in the intensity of the optical signal. The controller 140 may acquire the ratio of change in the E/O conversion characteristic by utilizing a separate external processor. Also, the controller 140 may include an ADC or a DAC to calculate the ratio of change in the E/O conversion characteristic.

In other words, the controller 140 may identify an E/O conversion characteristic of the optical signal transmission apparatus based on the supervisory signal processed by the supervisory signal processing device. The E/O conversion characteristic may include a correspondence relationship between a plurality of levels of an intensity of a multi-level electric signal input to the E/O converter 130 and a plurality of levels of an intensity of an optical signal output from the E/O converter 130. Also, the E/O conversion characteristic may include a correspondence relationship between an intensity of a control signal and the intensity of the optical signal output from the E/O converter 130. For example, the E/O conversion characteristic may include a correspondence relationship between a bias signal input to the E/O converter 130 and an optical signal of the E/O converter 130. The E/O conversion characteristic may include a correspondence relationship between a gain of the amplifier 120 or an optical signal amplifier (not shown) and an optical signal of the E/O converter 130.

The E/O conversion characteristic may refer to information indicating a change in an intensity of an optical signal based on a change in an intensity of a control signal or an intensity of a multi-level electric signal. The E/O conversion characteristic may have both a nonlinear characteristic and a linear characteristic. In other words, an intensity of an optical signal may linearly or nonlinearly change based on a change in an intensity of an input control signal or an intensity of a multi-level electric signal. The controller 140 may determine an input range of a control signal input to the amplifier 120 or the E/O converter 130 so that an intensity of an optical signal may linearly change based on a change in an intensity of the input control signal or an intensity of a multi-level electric signal.

Figure 2:
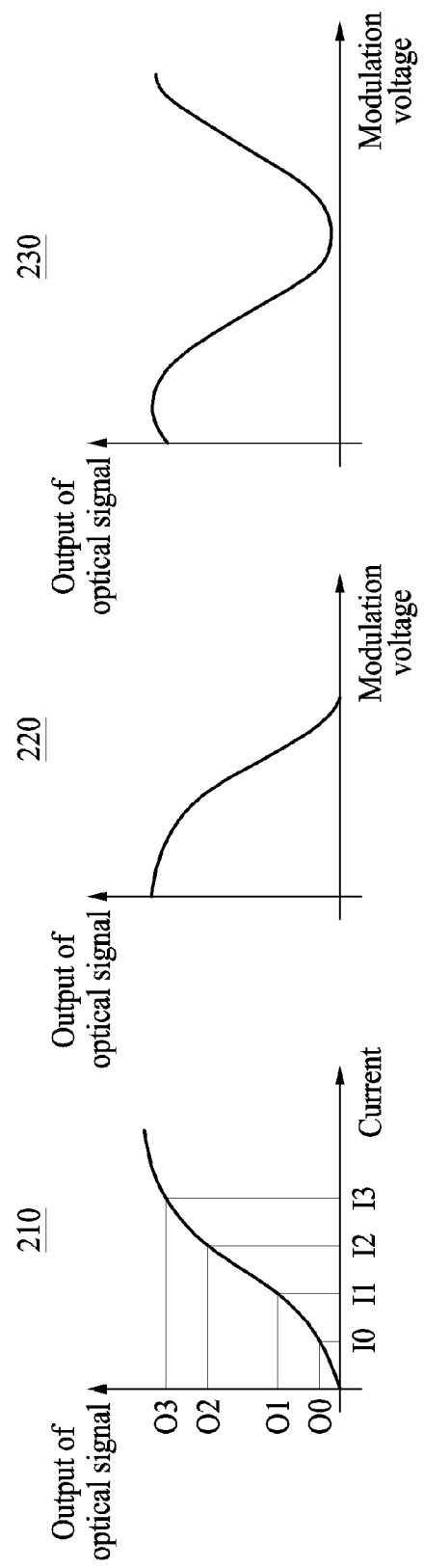
FIG. 2 illustrates graphs of examples of an electric-to-optical (E/O) conversion characteristic of an optical signal transmission apparatus according to an example embodiment.

FIG. 2 illustrates graphs of an E/O conversion characteristic of an optical signal transmission apparatus according to an example embodiment.

Referring to FIG. 2, a graph 210 shows, as an E/O conversion characteristic of an E/O converter that generates an optical signal based on a direct modulation scheme, an intensity of an optical signal based on a current intensity of a control signal input to the E/O converter. The E/O converter that generates the optical signal based on the direct modulation scheme may include a VCSEL or a DFB laser diode. As described above, a control signal input to the E/O converter that generates the optical signal based on the direct modulation scheme may be a signal obtained by combining a multi-level electric signal and a bias signal (for example, a DC signal in the direct modulation scheme).

Since the control signal is a signal obtained by combining a multi-level electric signal and a bias signal (for example, a DC signal in the direct modulation scheme), a number of levels of the current intensity of the control signal may be determined as a number of levels of the multi-level electric signal. In the following description, the multi-level electric signal may be assumed to have four levels. The graph 210 shows levels I0, I1, I2 and I3 of the current intensity of the control signal respectively corresponding to the four levels of the multi-level electric signal.

In the graph 210, an intensity of an optical signal output from the VCSEL or the DFB laser diode of the E/O converter may be determined based on an intensity of the control signal. When the control signal with the current intensity of different levels, that is, the levels I0, I1, I2 and I3 is input, the E/O converter may output an optical signal with an intensity of different levels, for example, levels O0, O1, O2 and O3. The E/O conversion characteristic of the E/O converter may have a nonlinear characteristic or a linear characteristic based on the intensity of the control signal.

In other words, even when intervals between the levels I0, I1, I2 and I3 are equal, intervals between the levels O0, O1, O2 and O3 may be different from each other. Even when an intensity of the control signal is changed from an intensity of the control signal with the nonlinear characteristic of the E/O conversion characteristic, the intensity of the optical signal may remain unchanged. Thus, an interval between levels of a multi-level electric signal may not match an interval between levels of a multi-level optical signal. Also, even when intervals between the levels of the multi-level electric signal are equal, intervals between the levels of the multi-level optical signal may be different from each other.

Referring to FIG. 2, it may be confirmed that a change in the intensity of the optical signal between the levels O1 and O0 in response to a change from the level I0 to the level I1 is less than a change in the intensity of the optical signal between the levels O2 and O1 in response to a change from the level I1 to level I2. Similarly, it may be confirmed that a change in the intensity of the optical signal between the levels O3 and O2 in response to a change from the level I2 to the level I3 is less than the change in the intensity of the optical signal between the levels O2 and O1 in response to the change from the level I1 to the level I2. In other words, the E/O converter may more nonlinearly operate in a section between the levels I0 and I1 than a section between the levels I1 and I2 or a section between the levels I2 and I3.

For example, when the optical signal transmission apparatus needs to generate a multi-level optical signal corresponding to a multi-level electric signal, the optical signal transmission apparatus may operate in sections other than a section of the control signal (for example, the section between the levels I0 and I1 as a section of the current intensity of the control signal) for a nonlinear operation. In other words, the optical signal transmission apparatus may operate in a section of a linear control signal. In this example, an interval between levels of the optical signal may more accurately match an interval between different levels of the multi-level electric signal.

The optical signal transmission apparatus may control a gain of an amplifier that amplifies an electric signal or a bias signal input to the E/O converter in response to the E/O conversion characteristic of the E/O converter. The E/O conversion characteristic may be determined based on a type of a laser diode or a modulator included in the E/O converter.

The E/O converter may generate an optical signal based on a direct modulation scheme, or may generate an optical signal by modulating an optical signal of a CW laser diode using a modulator such as an EAM and an MZM. Referring to FIG. 2, a graph 220 shows an intensity of an optical signal based on an intensity (for example, a modulation voltage) of a control signal input to an EAM included in the E/O converter. A graph 230 shows an intensity of an optical signal based on an intensity (for example, a modulation voltage) of a control signal input to an MZM included in the E/O converter.

Similar to the above description of the graph 210, even when the EAM or the MZM is used, a change in the intensity of the optical signal based on a change in the intensity of the control signal may not be constant. In other words, an E/O conversion characteristic of the E/O converter that uses the EAM or the MZM may also have a nonlinear characteristic based on the intensity of the control signal.

A result obtained by comparing the graphs 210, 220 and 230 may indicate different changes in the intensity of the optical signal based on the intensity of the control signal. In other words, the E/O conversion characteristic may be determined based on a type of a laser diode or a modulator included in the E/O converter. For example, when an E/O converter that uses an E/O conversion characteristic, for example, a direct modulation scheme, is included in the optical signal transmission apparatus prior to a transmission of an optical signal, the optical signal transmission apparatus may acquire a correspondence relationship between the intensity of the control signal and the intensity of the optical signal as shown in the graph 210. The optical signal transmission apparatus may generate an optical signal that has levels at a desired interval by adjusting a range of intensities of the control signal to be used to generate a multi-level optical signal based on the correspondence relationship.

Figure 3:
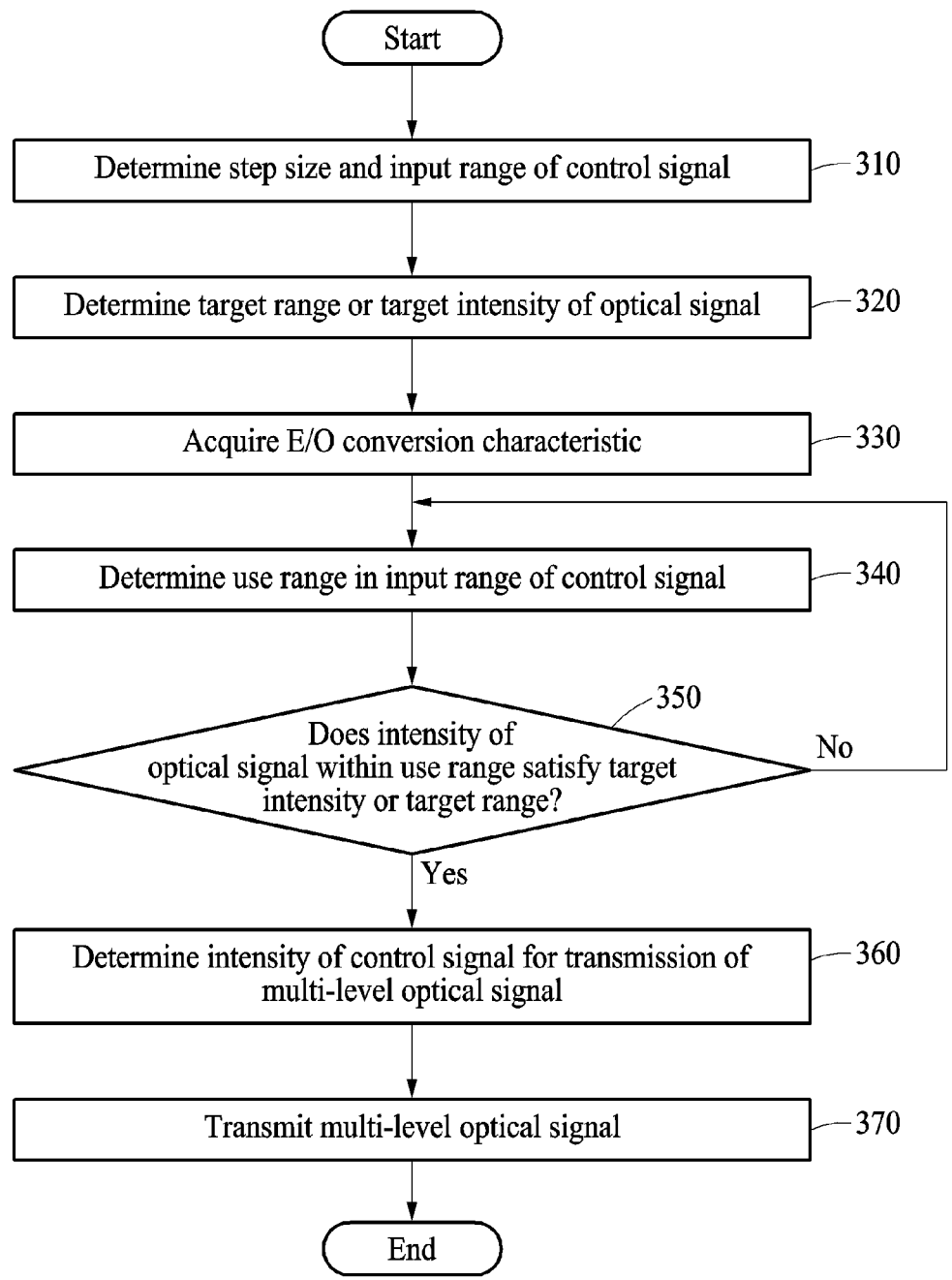
FIG. 3 is a flowchart illustrating an operation of an optical signal transmission apparatus to generate an optical signal based on an E/O conversion characteristic according to an example embodiment.
Figure 4:
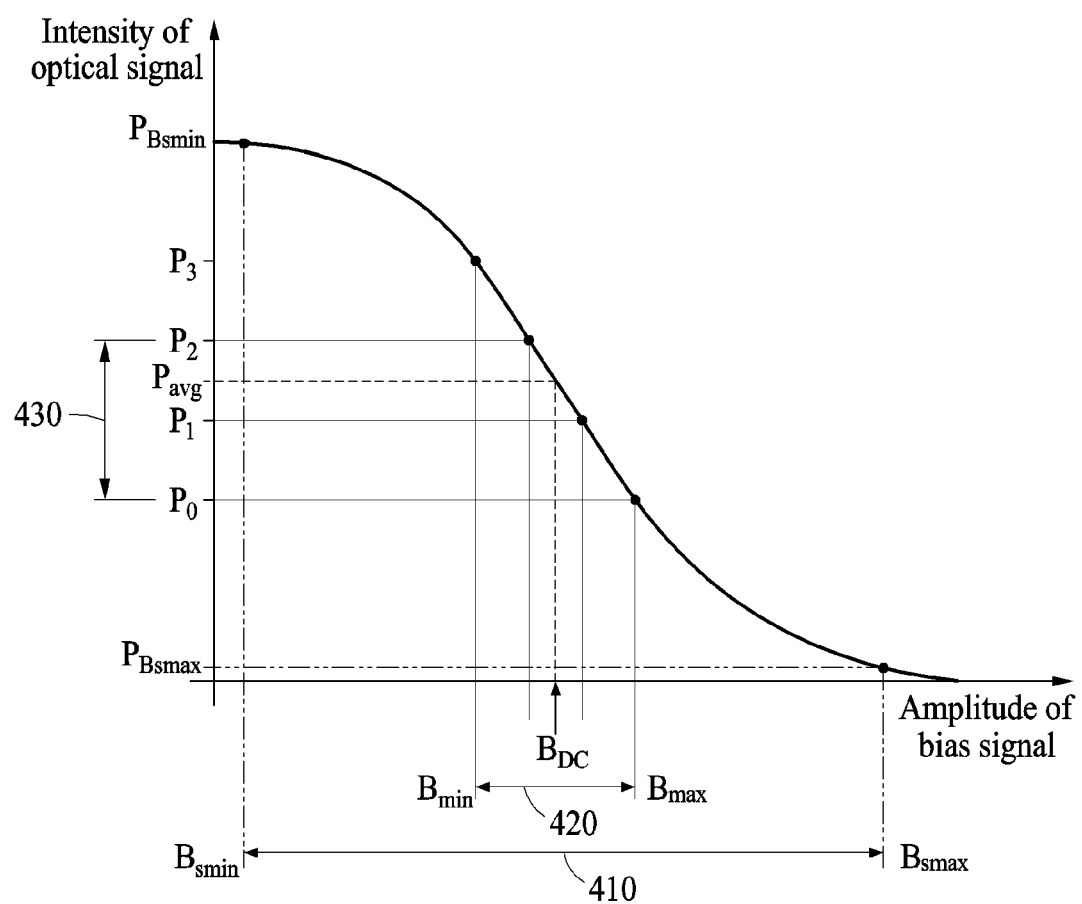
FIG. 4 is a graph illustrating an example of an operation of an optical signal transmission apparatus to acquire an E/O conversion characteristic according to an example embodiment.
Figure 5:
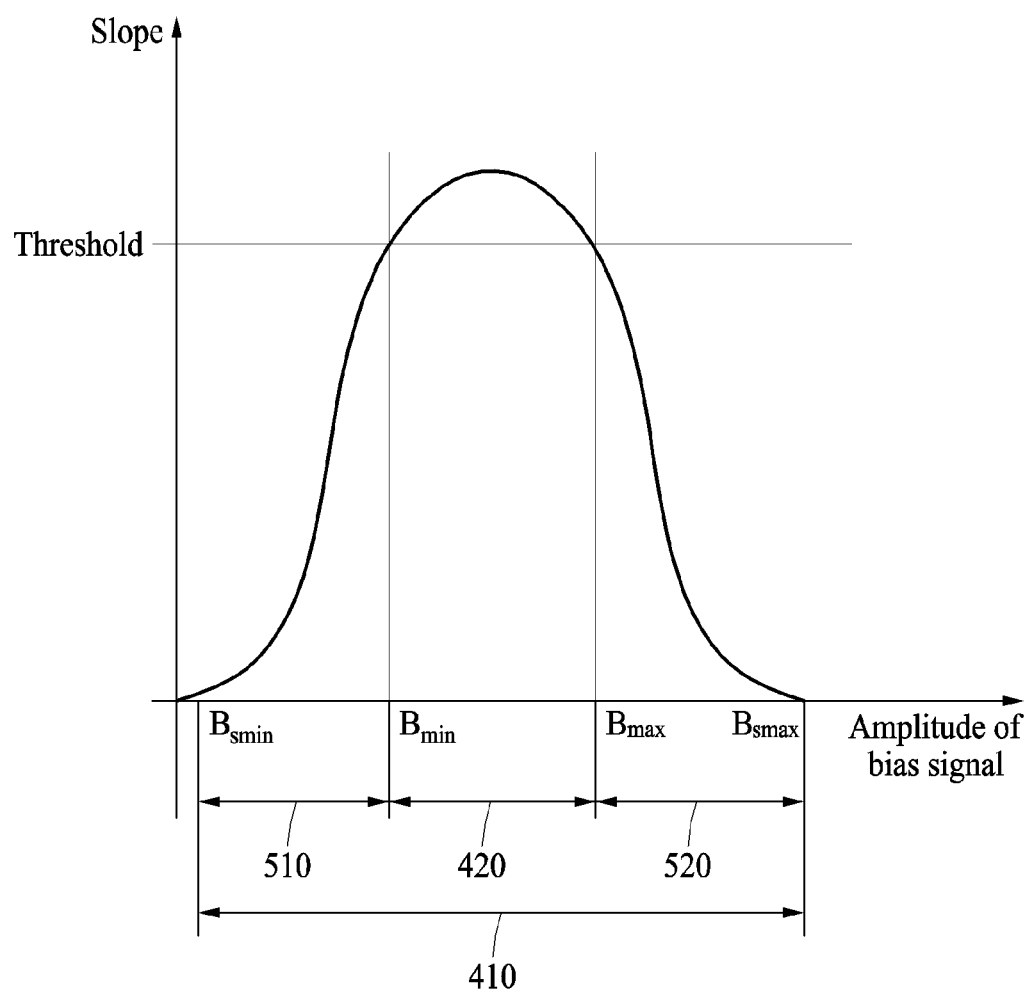
FIG. 5 is a graph illustrating a ratio of change in the E/O conversion characteristic of FIG. 4.

FIG. 3 is a flowchart illustrating an operation of an optical signal transmission apparatus to generate an optical signal based on an E/O conversion characteristic according to an example embodiment. FIG. 4 is a graph illustrating an operation of an optical signal transmission apparatus to acquire an E/O conversion characteristic according to an example embodiment. FIG. 5 is a graph illustrating a ratio of change in the E/O conversion characteristic of FIG. 4. Hereinafter, an operation of the optical signal transmission apparatus to acquire a correspondence relationship between an amplitude of a bias signal and an intensity of an optical signal as an E/O conversion characteristic will be described with reference to FIGS. 3 through 5. The operation of FIG. 3 may be performed by, for example, the controller 140 of FIG. 1.

Referring to FIG. 3, in operation 310, the optical signal transmission apparatus may determine a step size of a control signal and an input range of the control signal that allows the control signal to be input to an amplifier or an E/O converter, to acquire an E/O conversion characteristic. For example, the optical signal transmission apparatus may measure an intensity of an optical signal while changing an intensity of a current or a voltage of a bias signal input to the E/O converter within the input range, and may acquire the E/O conversion characteristic from the measured intensity of the optical signal. In this example, the optical signal transmission apparatus may determine an input range of intensities of the current or the voltage of the bias signal, and a step size (for example, a sweep interval or an increment) of the current or the voltage of the bias signal.

The input range of the control signal may be determined in a range to prevent a damage of the E/O converter. For example, an input range of an amplitude of a bias signal as a control signal may be determined based on a bias range of a data sheet of the E/O converter. Depending on example embodiments, the step size and the input range of the control signal may be input by a user of the optical signal transmission apparatus.

For example, the optical signal transmission apparatus may be assumed to acquire an E/O conversion characteristic of an E/O converter including an EAM. In this example, a bias signal input to the EAM may be used as a control signal. The optical signal transmission apparatus may determine a use range of the control signal within an input range to prevent a damage of the EAM. FIG. 4 illustrates an input range 410 of the control signal determined by the optical signal transmission apparatus. A maximum value and a minimum value of the input range 410 are denoted by $B_{smax}$ and $B_{smin}$, respectively.

Referring back to FIG. 3, in operation 320, the optical signal transmission apparatus may determine a target range or a target intensity of the optical signal.

The target range or the target intensity of the optical signal may be determined based on a type of an E/O converter or whether an optical signal amplifier is used. In an example, when the optical signal transmission apparatus includes an optical signal amplifier, the target range or the target intensity of the optical signal may be determined within an optical signal input range of the optical signal amplifier. In another example, the target range or the target intensity of the optical signal may be determined by an optical network system (for example, a passive optical network system) including the optical signal transmission apparatus. Depending on example embodiments, the target range or the target intensity of the optical signal may be input by a user of the optical signal transmission apparatus.

The optical signal transmission apparatus may change an intensity of a control signal to be input to the amplifier or the E/O converter based on the step size and the input range of the control signal determined in operation 310. The optical signal transmission apparatus may sweep the intensity of the control signal within the input range based on a sweep interval of the control signal. Referring to FIG. 4, the optical signal transmission apparatus may sequentially increase the intensity of the control signal input to the E/O converter at $\Delta B$ from $B_{smin}$ to $B_{smax}$ within the input range 410.

The optical signal transmission apparatus may acquire a portion of an optical signal that is output in response to the sweeping of the intensity of the control signal, using a supervisory signal generation device such as a monitoring PD. As a result, the optical signal transmission apparatus may acquire a supervisory signal by performing O/E conversion of a portion or all of an optical signal output from the E/O converter in response to a change in the intensity of the control signal.

Referring to FIG. 3, in operation 330, the optical signal transmission apparatus may acquire an E/O conversion characteristic of the E/O converter from the acquired supervisory signal. For example, the optical signal transmission apparatus may acquire a correspondence relationship between the control signal and the optical signal. Referring to FIG. 4, the optical signal transmission apparatus may acquire a change in an intensity of the optical signal from $P_{Bsmax}$ to $P_{Bsmin}$ while sequentially increasing the intensity of the control signal input to the E/O converter at $\Delta B$ from $B_{smin}$ to $B_{smax}$ within the input range 410. The optical signal transmission apparatus may acquire the E/O conversion characteristic of FIG. 4, by matching a change in the intensity of the control signal (for example, a bias signal in FIG. 4) and the change in the intensity of the optical signal.

The optical signal transmission apparatus may measure a ratio between the change in the intensity of the control signal and the change in the intensity of the optical signal. When the E/O conversion characteristic of FIG. 4 is acquired, the optical signal transmission apparatus may measure a ratio between a change in the amplitude of the bias signal and the change in the intensity of the optical signal, using a differentiation.

The graph of FIG. 5 shows the ratio (for example, a ratio of change, a differential coefficient or a slope of a curve of FIG. 4) between the change in the amplitude of the bias signal and the change in the intensity of the optical signal acquired from the E/O conversion characteristic of FIG. 4 by the optical signal transmission apparatus. In FIG. 5, an absolute value of the ratio (that is, the slope of the curve of FIG. 4) between the change in the amplitude of the bias signal and the change in the intensity of the optical signal may gradually increase and then decrease again when the amplitude of the bias signal increases within the input range 410.

Referring back to FIG. 3, in operation 340, the optical signal transmission apparatus may determine a use range of the control signal required by the E/O converter to output a multi-level optical signal within the input range determined in operation 310 based on the E/O conversion characteristic acquired in operation 330. For example, based on a nonlinear characteristic included in the E/O conversion characteristic, the optical signal transmission apparatus may determine a use range 420 within the input range 410 as shown in FIG. 4.

As described above, the nonlinear characteristic included in the E/O conversion characteristic may be used to reduce or eliminate a change in the intensity of the optical signal based on a change (for example, a change in a level of an intensity of a multi-level electric signal) in an intensity of an electric signal. Referring to FIG. 5, in sections 510 and 520 of intensities of a bias signal corresponding to a relatively low slope, the intensity of the optical signal may relatively slightly change even when an intensity of a multi-level electric signal changes based on levels. In other words, in the sections 510 and 520, the E/O conversion characteristic may have a nonlinear characteristic. For example, when the E/O conversion characteristic is represented by a graph, the E/O converter may more nonlinearly operate as a slope of the graph decreases.

The optical signal transmission apparatus may determine the use range 420 within the input range 410, by comparing a ratio (that is, the slope of the curve of FIG. 4) between a change in the intensity of the control signal and the change in the intensity of the optical signal to a preset threshold. For example, when a section of intensities of the control signal that allows the ratio between the change in the intensity of the control signal and the change in the intensity of the optical signal to be less than or equal to the preset threshold is within the input range determined in operation 310, the optical signal transmission apparatus may determine the use range 420 by excluding the section from the input range 410.

For example, referring to FIG. 5, the sections 510 and 520 that allow the ratio between the change in the amplitude of the bias signal and the change in the intensity of the optical signal to be less than or equal to the threshold, may be within the input range 410 as an input range of intensities of the bias signal. In this example, the optical signal transmission apparatus may determine the use range 420 by excluding the sections 510 and 520 from the input range 410.

In other words, the optical signal transmission apparatus may compare the ratio (that is, the slope) between the change in the amplitude of the bias signal and the change in the intensity of the optical signal to a preset threshold, and may determine a section in which the ratio is greater than or equal to the preset threshold as the use range 420 (or a change range) of intensities of the bias signal to be used to transmit a multi-level electric signal. Referring to FIG. 4, the use range 420 may have a slope greater than or equal to a preset threshold, and accordingly an abstract shape of the graph showing the E/O conversion characteristic may be approximated to a straight line (that is, a linear graph) in the use range 420. Thus, the E/O converter may linearly operate within the use range determined in operation 340.

Referring back to FIG. 3, in operation 350, the optical signal transmission apparatus may determine whether an average of intensities of the optical signal within the use range is identical to the target intensity determined in operation 320 or whether the average is included in the target range determined in operation 320. For example, the optical signal transmission apparatus may compare an average of intensities of the optical signal respectively corresponding to a maximum value and a minimum value of the intensity of the control signal within the use range to the target intensity or the target range.

Referring to FIG. 4, the optical signal transmission apparatus may compare an average of intensities of the optical signal corresponding to the use range 420 to the target intensity or the target range. For example, a maximum value and a minimum value in the use range 420 may be denoted by $B_{max}$ and $B_{min}$, respectively, and intensities of the optical signal corresponding to the maximum value $B_{max}$ and the minimum value $B_{min}$ may be denoted by $P_{Bmax}$ and $P_{Bmin}$, respectively. The optical signal transmission apparatus may determine an average $P_{avg}$ of intensities of the optical signal corresponding to the use range 420 to be "$(P_{Bmax}+P_{Bmin})/2$." The optical signal transmission apparatus may determine whether the average $P_{avg}$ is identical to the target intensity, or whether the average $P_{avg}$ is included in the target range.

When the average $P_{avg}$ is identical to the target intensity, or when the average $P_{avg}$ is included in the target range, the optical signal transmission apparatus may determine an intensity of the control signal for a transmission of a multi-level optical signal based on the determined use range in operation 360. For example, the optical signal transmission apparatus may divide a range of intensities of the optical signal corresponding to the use range 420 based on a number of levels of an electric signal, to determine an intensity of the control signal for a transmission of the optical signal. Levels of the optical signal respectively corresponding to levels of a multi-level electric signal may be determined as boundary values of the divided range.

In an example, an electric signal may be assumed to have four levels. Referring to FIG. 4, the optical signal transmission apparatus may extract four levels, for example, P0, P1, P2 and P3, from a section 430 of intensities of an output optical signal corresponding to the use range 420. In another example, when a number of levels of the electric signal is "N," the optical signal transmission apparatus may divide a range of intensities of the optical signal into "N−1" or "N" sections, and may determine boundary values of the divided range as levels of the optical signal respectively corresponding to the levels of the electric signal.

The optical signal transmission apparatus may match levels of the optical signal determined or extracted from a section of intensities of the optical signal to levels of the electric signal, respectively. To match the levels of the optical signal to the levels of the electric signal, respectively, the optical signal transmission apparatus may determine an intensity of the control signal to acquire each of the levels of the optical signal based on the E/O conversion characteristic acquired in operation 330. Thus, the intensity of the control signal to acquire each of the levels of the optical signal may be included in the use range.

For example, the optical signal transmission apparatus may evenly divide a range of intensities of the optical signal corresponding to the use range. Thus, levels of an optical signal respectively corresponding to levels of a multi-level electric signal may have equal intervals. Referring to FIG. 4, a difference between P0 and P1, a difference between P1 and P2 and a difference between P2 and P3 may be the same. Since the use range 420 is determined as a range that allows the E/O converter to linearly operate, intervals between the levels of the control signal allowing intervals between the levels of the optical signal to be equal to each other may also be equal to each other. The optical signal transmission apparatus may increase levels of the optical signal based on a signal-to-noise ratio (SNR) in response to an increase in the intensity of the optical signal.

Also, the optical signal transmission apparatus may identify, based on the E/O conversion characteristic, an intensity (for example, $B_{DC}$ of FIG. 4) of the control signal that allows an average of intensities of the optical signal corresponding to the use range 420 to be output, and an intensity of the control signal corresponding to each of the determined levels of the optical signal.

When the average of the intensities of the optical signal is different from the target intensity, or when the average is not included in the target range, the optical signal transmission apparatus may adjust the use range so that the average may be identical to the target intensity, or that the average is included in the target range. Referring to FIG. 4, when the average $P_{avg}$ is different from the target intensity, or when the average $P_{avg}$ is not included in the target range, the optical signal transmission apparatus may adjust the use range 420 based on the target intensity or the target range. An operation of the optical signal transmission apparatus to adjust the use range 420 based on the target range will be described below.

Referring back to FIG. 3, in operation 370, the optical signal transmission apparatus may transmit a multi-level optical signal based on the determined intensity of the control signal. For example, the optical signal transmission apparatus may generate a multi-level optical signal by inputting a control signal corresponding to a level of a multi-level electric signal to the E/O converter, the amplifier or the optical signal amplifier. In this example, an intensity of the control signal input to the E/O converter, the amplifier or the optical signal amplifier may be determined based on an intensity of a control signal corresponding to each of levels of the optical signal, or based on an intensity of the control signal that allows an average of intensities of the optical signal corresponding to the use range to be output. As described above, because the use range 420 that allows the E/O converter to linearly operate within the input range 410 is determined, the E/O converter may adjust a level of the optical signal in proportion to a level of an electric signal.

Figure 6:
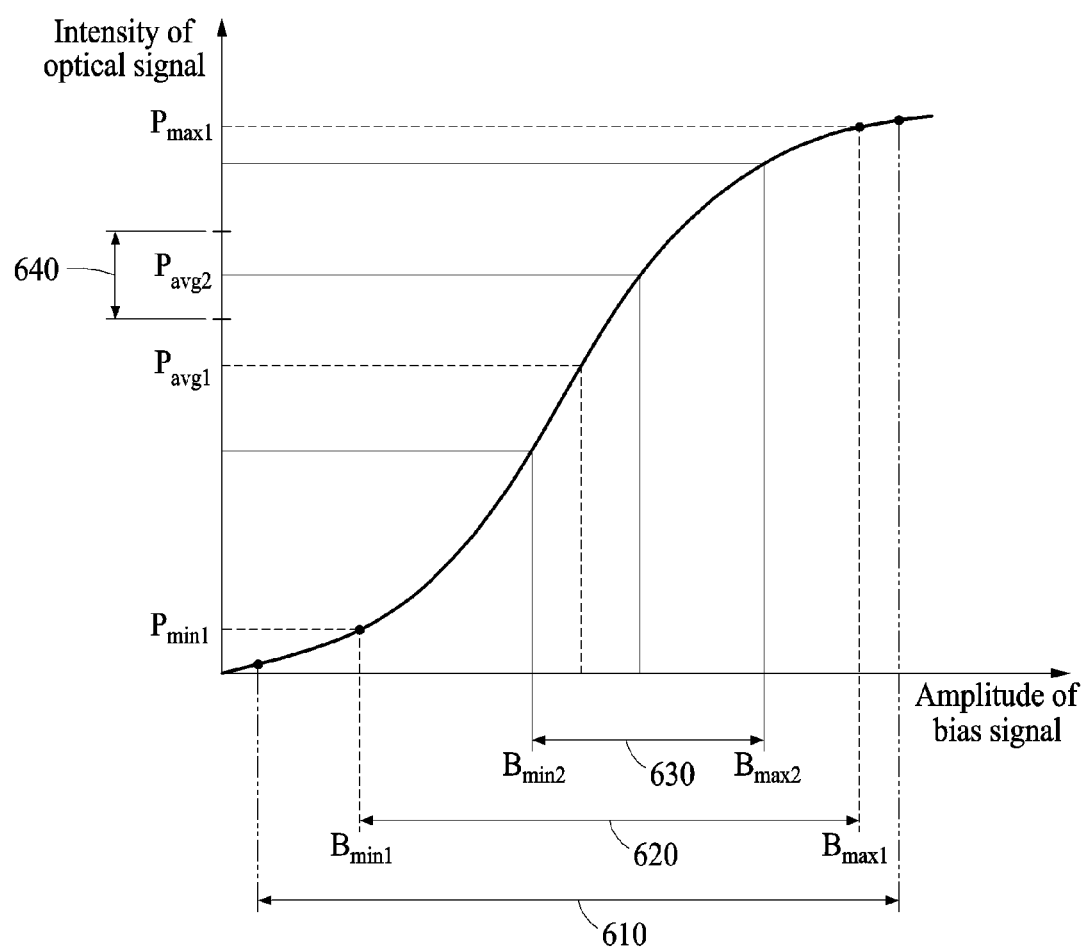
FIG. 6 is a graph illustrating an example of an E/O conversion characteristic acquired by an optical signal transmission apparatus according to an example embodiment.

FIG. 6 is a graph illustrating an example of an E/O conversion characteristic acquired by an optical signal transmission apparatus according to an example embodiment. Hereinafter, an operation of the optical signal transmission apparatus to adjust a use range of a control signal based on a target range is described with reference to FIG. 6. In the following description, the optical signal transmission apparatus may be assumed to include an E/O converter, such as a directly modulated laser (DML) or a VCSEL, employing a direct modulation scheme. Also, the optical signal transmission apparatus may adjust an amplitude of a bias signal input to the DML or the VCSEL as a control signal.

As described above, the optical signal transmission apparatus may sweep an intensity of a control signal within an input range 610 of the control signal, and may acquire an E/O conversion characteristic. Referring to FIG. 6, the input range 610 may be determined based on an operating range of the E/O converter. In an example, the optical signal transmission apparatus may increase the intensity of the control signal by a sweep interval from a minimum intensity to a maximum intensity within the input range 610. In another example, the optical signal transmission apparatus may decrease the intensity of the control signal by a sweep interval from the maximum intensity to the minimum intensity within the input range 610. When the intensity of the control signal is being swept based on the sweep interval within the input range 610, the optical signal transmission apparatus may acquire a change in an intensity of an optical signal from a supervisory signal, to acquire the E/O conversion characteristic of FIG. 6.

The graph of FIG. 6 shows a correspondence relationship between the amplitude of the bias signal and the intensity of the optical signal, as an E/O conversion characteristic acquired by the optical signal transmission apparatus. The optical signal transmission apparatus may calculate a ratio between a change in the amplitude of the bias signal and the change in the intensity of the optical signal. In other words, the optical signal transmission apparatus may calculate a slope of a curve that represents the intensity of the optical signal based on the amplitude of the bias signal as shown in FIG. 6.

The optical signal transmission apparatus may compare the ratio or the slope to a preset threshold, and may determine a user range 620 within the input range 610 so that an intensity of the control signal corresponding to the ratio or the slope that is greater than or equal to the threshold may be provided to the optical signal transmission apparatus. In other words, the optical signal transmission apparatus may provide intensities of the bias signal within the use range 620 in which the ratio or the slope is greater than or equal to the threshold to the E/O converter.

In FIG. 6, the optical signal transmission apparatus may compare an average of intensities of the optical signal corresponding to the use range 620 to a target range 640 of intensities of the optical signal. The average of the intensities of the optical signal corresponding to the use range 620 may be determined as an average $P_{avg1}$ of intensities $P_{max1}$ and $P_{min1}$ of the optical signal that respectively correspond to a maximum value $B_{max1}$ and a minimum value $B_{min1}$ within the use range 620. In other words, $P_{avg1}=(P_{max1}+P_{min1})/2$. As shown in FIG. 6, the average $P_{avg1}$ corresponding to the use range 620 is not included in the target range 640.

Since the average of the intensities of the optical signal is not included in the target range 640, the optical signal transmission apparatus may change the use range 620. For example, based on the target range 640, the optical signal transmission apparatus may change the use range 620 to a use range 630. An average of intensities of the optical signal based on the use range 630 may be determined as an average $P_{avg2}$ of intensities $P_{max2}$ and $P_{min2}$ of the optical signal that respectively correspond to a maximum value $B_{max2}$ and a minimum value $B_{min2}$ within the use range 630. In other words, $P_{avg2}=(P_{max2}+P_{min2})/2$.

As shown in FIG. 6, the average $P_{avg2}$ is included in the target range 640. Thus, the optical signal transmission apparatus may determine an intensity of a control signal to be used to generate a multi-level electric signal as an amplitude of the bias signal corresponding to the use range 630. For example, the optical signal transmission apparatus may determine the same number of levels of the intensity of the optical signal as a number of levels of a multi-level electric signal within a range of intensities of the optical signal corresponding to the use range 630. When the multi-level electric signal is received, the optical signal transmission apparatus may generate an optical signal corresponding to the multi-level electric signal by inputting an intensity of the control signal to generate the determined levels of the intensity of the optical signal to the E/O converter. Thus, the E/O converter may linearly operate.

According to example embodiments as described above, the optical signal transmission apparatus may generate a multi-level optical signal from a multi-level electric signal. The optical signal transmission apparatus may detect, based on a supervisory signal generated from the optical signal, an E/O conversion characteristic of an E/O converter configured to convert an electric signal into an optical signal. The optical signal transmission apparatus may adjust a bias signal input to the E/O converter and a range of gains of an amplifier or an optical signal amplifier so that the E/O converter may operate in an operating region with a linear E/O conversion characteristic. Also, the optical signal transmission apparatus may generate a multi-level optical signal with an interval desired by a user of the optical signal transmission apparatus by adjusting the bias signal input to the E/O converter and the range of the gains of the amplifier or the optical signal amplifier.

For example, when the E/O converter generates a multi-level optical signal from a multi-level electric signal based on a bias signal, the optical signal transmission apparatus may determine a correspondence relationship between the bias signal and the optical signal by sweeping an amplitude of the bias signal within an input range. The optical signal transmission apparatus may adjust, based on the determined correspondence relationship, a use range of intensities of the bias signal so that the E/O converter may linearly operate. In other words, an operating condition of the E/O converter may be optimized. For example, the optical signal transmission apparatus may compare a ratio between a change in the amplitude of the bias signal and a change in an intensity of the optical signal to a threshold, to adjust a use range that is to be used to generate a multi-level optical signal.

In particular, a section in which the intensity of the optical signal slightly changes in comparison to the amplitude of the bias signal may be excluded from the use range, and thus the E/O converter may linearly operate within the adjusted use range. An intensity of a control signal to generate a multi-level optical signal may be determined within the adjusted use range. Also, the optical signal transmission apparatus may adjust the use range regardless of a type of the E/O converter.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The modules, apparatuses, and other components described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical signal transmission apparatus comprising:
    an electric-to-optical (E/O) converter configured to convert an electric signal into an optical signal based on a bias signal;
    a supervisory signal generator configured to convert a portion of the optical signal into an electric signal and to generate a supervisory signal from the converted electric signal, the supervisory signal being used to adjust the bias signal; and
    a controller configured to determine a correspondence relationship between the bias signal and the optical signal from the supervisory signal and to adjust the bias signal based on the determined correspondence relationship.

2. The optical signal transmission apparatus of claim 1, wherein the controller is configured to:
    change an amplitude of the bias signal at predetermined intervals within an input range of the bias signal that allows the bias signal to be input to the E/O converter; and
    determine a use range of intensities of the bias signal required by the E/O converter to output a multi-level optical signal within the input range based on a supervisory signal generated based on the changed amplitude of the bias signal.

3. The optical signal transmission apparatus of claim 2, wherein the controller is configured to measure, based on the generated supervisory signal, a change in an intensity of the optical signal output from the E/O converter based on an amplitude of the bias signal corresponding to the use range.

4. The optical signal transmission apparatus of claim 2, wherein the controller is configured to:
    determine a ratio between a change in the amplitude of the bias signal and a change in an intensity of the optical signal based on the generated supervisory signal; and
    determine to change the use range when the determined ratio is less than or equal to a preset threshold.

5. The optical signal transmission apparatus of claim 4, wherein when it is determined to change the use range, the controller is configured to change the use range based on an amplitude of the bias signal that allows the determined ratio to be greater than or equal to the preset threshold.

6. The optical signal transmission apparatus of claim 4, wherein when the intensity of the optical signal nonlinearly changes based on the change in the amplitude of the bias signal, the controller is configured to change the use range based on the amplitude of the bias signal that allows the intensity of the optical signal to nonlinearly change.

7. The optical signal transmission apparatus of claim 4, wherein the controller is configured to determine whether to change the use range by comparing an average of intensities of the optical signal respectively corresponding to a maximum value and a minimum value within the use range to a predetermined target intensity or a predetermined target range.

8. The optical signal transmission apparatus of claim 1, wherein the controller is configured to adjust the bias signal so that an intensity of the optical signal is converted in correspondence to a plurality of levels of an intensity of the electric signal.

9. The optical signal transmission apparatus of claim 8, wherein the controller is configured to determine an intensity of the optical signal corresponding to each of the plurality of levels of the intensity of the electric signal in an output range of the intensity of the optical signal corresponding to a use range of intensities of the bias signal that allows the intensity of the optical signal to linearly change based on a change in the amplitude of the bias signal.

10. An optical signal transmission apparatus comprising:
    an amplifier configured to amplify an electric signal having an intensity of a level selected from a plurality of levels of an intensity of the electric signal;
    an electric-to-optical (E/O) converter configured to convert the amplified electric signal into an optical signal;
    a supervisory signal generator configured to convert a portion of the optical signal into an electric signal and to generate a supervisory signal from the converted electric signal, the supervisory signal being used to adjust a gain of the amplifier; and
    a controller configured to determine a correspondence relationship between the plurality of levels of the intensity of the electric signal and a plurality of levels of an intensity of the optical signal and to adjust the gain of the amplifier based on the determined correspondence relationship.

11. The optical signal transmission apparatus of claim 10, wherein the controller is configured to:
    change the gain of the amplifier at predetermined intervals within a maximum gain range in which the gain is changeable; and
    determine a use gain range required by the E/O converter to output a multi-level optical signal within the maximum gain range based on a supervisory signal generated based on the changed gain.

12. The optical signal transmission apparatus of claim 11, wherein the controller is configured to:
    determine a ratio between a change in the gain and a change in an intensity of the optical signal based on the generated supervisory signal; and determine to change the use gain range when the determined ratio is less than or equal to a preset threshold.

13. The optical signal transmission apparatus of claim 11, wherein when an intensity of the optical signal nonlinearly changes based on the changed gain, the controller is configured to change the use gain range based on a range of a change in the gain that allows the intensity of the optical signal to nonlinearly change.

14. The optical signal transmission apparatus of claim 11, wherein the controller is configured to determine whether to change the use gain range by comparing an average of intensities of the optical signal respectively corresponding to a maximum value and a minimum value of the gain included in the use gain range to a predetermined target intensity or a predetermined target range.

15. The optical signal transmission apparatus of claim 10, wherein the controller is configured to determine the correspondence relationship based on an output range of an intensity of the optical signal corresponding to a range of a change in the gain that allows the intensity of the optical signal to linearly change.

16. A method performed by an optical signal transmission apparatus, the method comprising:
changing an intensity of a control signal at predetermined intervals, the control signal being input to an electric-to-optical (E/O) converter configured to convert an electric signal into an optical signal or an amplifier configured to amplify the electric signal input to the E/O converter;
receiving a supervisory signal generated by converting a portion of the optical signal output from the E/O converter into an electric signal in correspondence to the changed intensity of the control signal;
acquiring a correspondence relationship between the control signal and the optical signal from the supervisory signal; and
determining a use range of the intensity of the control signal based on the acquired correspondence relationship.

17. The method of claim 16, wherein the acquiring of the correspondence relationship comprises measuring a ratio between a change in the intensity of the control signal and a change in an intensity of the optical signal.

18. The method of claim 17, wherein the determining of the use range comprises determining the use range based on an intensity of the control signal that allows the ratio to be greater than or equal to a preset threshold.

19. The method of claim 16, wherein the determining of the use range comprises determining whether to change the use range by comparing an average of intensities of the optical signal respectively corresponding to a maximum value and a minimum value within the use range to a predetermined target intensity or a predetermined target range.

* * * * *